US012758811B2

(12) United States Patent
Schlumm et al.

(10) Patent No.: US 12,758,811 B2
(45) Date of Patent: Oct. 13, 2026

(54) GAS EVAPORATION AND FLAME EXTINGUISHMENT

(71) Applicant: Hewlett-Packard Development Company, L.P., Spring, TX (US)

(72) Inventors: Doron Schlumm, Ness Ziona (IL); Mark Sandler, Ness Ziona (IL); Peter Nedelin, Ness Ziona (IL); Assaf Pines, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 497 days.

(21) Appl. No.: 18/549,640

(22) PCT Filed: Mar. 11, 2021

(86) PCT No.: PCT/US2021/021884
§ 371 (c)(1),
(2) Date: Sep. 8, 2023

(87) PCT Pub. No.: WO2022/191846
PCT Pub. Date: Sep. 15, 2022

(65) Prior Publication Data

US 2024/0149084 A1 May 9, 2024

(51) Int. Cl.

| | |
|---|---|
| ***A62C 4/00*** | (2006.01) |
| ***B41J 29/377*** | (2006.01) |
| ***G03G 15/00*** | (2006.01) |
| ***G03G 15/10*** | (2006.01) |
| ***G03G 15/11*** | (2006.01) |
| ***G03G 15/16*** | (2006.01) |
| ***G03G 21/20*** | (2006.01) |

(52) U.S. Cl.
CPC ............... *A62C 4/00* (2013.01); *B41J 29/377* (2013.01); *G03G 15/107* (2013.01); *G03G 15/11* (2013.01); *G03G 15/161* (2013.01); *G03G 15/55* (2013.01); *G03G 21/206* (2013.01)

(58) Field of Classification Search
CPC ...... G03G 15/10; G03G 15/11; G03G 15/161; G03G 15/5004; G03G 15/55; G03G 21/206; B41J 29/377
See application file for complete search history.

(56) References Cited

U.S. PATENT DOCUMENTS

| | | | | |
|---|---|---|---|---|
| 4,150,495 A | | 4/1979 | Stern | |
| 4,343,096 A | * | 8/1982 | Bergland | F26B 23/022 34/79 |
| 4,545,360 A | | 10/1985 | Smith et al. | |

(Continued)

FOREIGN PATENT DOCUMENTS

| | | |
|---|---|---|
| DE | 1942299 A1 | 2/1972 |
| EP | 1748259 A1 | 1/2007 |

(Continued)

*Primary Examiner* — Carla J Therrien
(74) *Attorney, Agent, or Firm* — Jordan IP Law, LLC

(57) ABSTRACT

In an example, a heated air knife and a negative pressure component are controlled to heat a subject gas and direct the subject gas through an evaporation channel at a target gas velocity that is above a flame propagation velocity for the subject gas. The evaporation channel is defined in part by a first surface, a nozzle of the air knife, a mixing zone, and a second surface substantially opposite the first surface.

15 Claims, 9 Drawing Sheets

(56) References Cited

U.S. PATENT DOCUMENTS

| | | | | |
|---|---|---|---|---|
| 5,097,764 | A | 3/1992 | Waizmann | |
| 5,799,725 | A | 9/1998 | Bradley et al. | |
| 6,378,605 | B1 | 4/2002 | Kutscher et al. | |
| 6,581,928 | B1 | 6/2003 | Stephan | |
| 7,850,274 | B1 * | 12/2010 | Chang | B41J 29/02 347/18 |
| 8,256,212 | B2 | 9/2012 | Miretti | |
| 8,550,151 | B2 | 10/2013 | Murayama et al. | |
| 8,955,948 | B2 | 2/2015 | Rolland | |
| 8,989,617 | B2 | 3/2015 | Shalem et al. | |
| 9,046,872 | B2 | 6/2015 | Ikeda et al. | |
| 9,656,493 | B2 | 5/2017 | Bildstein et al. | |
| 9,673,370 | B2 | 6/2017 | Kim | |
| 2003/0106677 | A1 | 6/2003 | Memory et al. | |
| 2005/0217523 | A1 | 10/2005 | Hachmann et al. | |
| 2008/0084465 | A1 | 4/2008 | Telken et al. | |
| 2012/0102974 | A1 | 5/2012 | Kawazoe et al. | |
| 2021/0047774 | A1 | 2/2021 | Han et al. | |

FOREIGN PATENT DOCUMENTS

| | | | |
|---|---|---|---|
| JP | H08166722 | A * | 6/1996 |
| JP | 11-303689 | A | 11/1999 |
| WO | 2013/137847 | A1 | 9/2013 |
| WO | 2020/060528 | A1 | 3/2020 |
| WO | 2020/101655 | A1 | 5/2020 |
| WO | 2020/242500 | A1 | 12/2020 |

* cited by examiner

GAS EVAPORATION AND FLAME EXTINGUISHMENT

BACKGROUND

A printer may apply print agents to a paper or another substrate. One example of a printer is a Liquid Electro-Photographic ("LEP") printer, which may be used to print using a fluid print agent such as an electrostatic printing fluid. Such electrostatic printing fluid includes electrostatically charged or chargeable particles (for example, resin or toner particles which may be colorant particles) dispersed or suspended in a carrier fluid).

DRAWINGS

DETAILED DESCRIPTION

Figure 1:
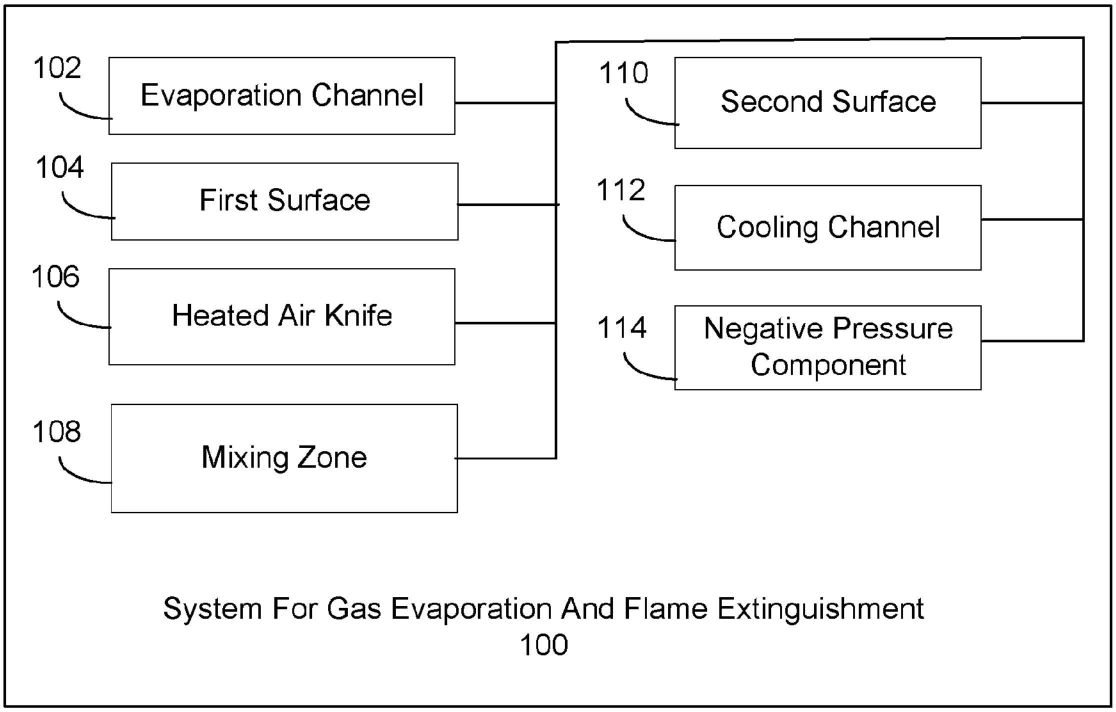
FIG. 1 is a block diagram depicting an example of a gas evaporation and flame extinguishment system.

In an example of LEP printing, a printer may form an image on a print substrate by placing an electrostatic charge on a photoconductive element, and then utilizing a laser scanning unit to apply an electrostatic pattern of the desired image on the photoconductive element to selectively discharge the photoconductive element. The selective discharging forms a latent electrostatic image on the photoconductive element. The printer includes a development station to develop the latent image into a visible image by applying a thin layer of electrostatic print fluid (which may be generally referred to as "LEP print fluid", or "electronic print fluid", "LEP ink", or "electronic ink" in some examples) to the patterned photoconductive element. Charged particles (sometimes referred to herein as "print fluid particles" or "colorant particles") in the LEP print fluid adhere to the electrostatic pattern on the photoconductive element to form a print fluid image. In examples, the print fluid image, including colorant particles and carrier fluid, is transferred utilizing a combination of heat and pressure from the photoconductive element to an intermediate transfer member (sometimes referred herein as an "ITM" or a "blanket") attached to a rotatable ITM drum or ITM belt. The ITM is heated until carrier fluid evaporates, and colorant particles melt, and a resulting molten film representative of the image is then applied to the surface of the print substrate via pressure and tackiness. In examples, the ITM that is attached to the ITM drum or ITM belt is a consumable or replaceable ITM.

In examples, the LEP print fluid may include a carrier fluid that is an isoparaffinic hydrocarbon solvent. During the heating of the ITM to melt the LEP print fluid to form a molten film, carrier fluid is evaporated from the LEP print fluid. In examples, the evaporated carrier fluid is directed away from the ITM and cooled, such that some of the carrier fluid may condense and reused at the press for another print job. In LEP printing the printer is tasked to handle the carrier fluid vapor that results from carrier fluid evaporation in a manner that is safe and friendly to the environment.

In certain examples, the LEP printer may include a set of developer units for applying various colors of LEP print fluid to a single photoconductive element, wherein the photoconductive element is to apply the color separations to form a color image on a ITM attached to a drum. Such LEP printers may employ a carrier fluid vapor dilution system that controls the carrier fluid vapor fluid concentration in the exhaust such that the highest concentration does not exceed a published ¼ LEL (Lower Explosion Limit) level for the carrier fluid. Some such LEP presses may control the carrier fluid concentration, e.g., by diluting the carrier fluid vapor evaporated from the ITM with a fresh air.

In other examples, an LEP printer may include a heated ITM belt that is wrapped around transport rollers, with multiple photoconductive elements 1-*n* positioned to engage and disengage from the ITM to apply different colors 1-*n* of LEP print fluid to the ITM belt. In examples, each of the photoconductive elements 1-*n* has a dedicated developer unit that is to apply a color of colors 1-*n* of LEP print fluid. In an example each of the photoconductive elements 1-*n* is to apply one of a set of image separations 1-*n* upon the ITM belt utilizing the LEP printing fluid colors 1-*n*. The set of photoconductive elements 1-*n* are to apply the separations 1-*n* in alignment with and at least partially overlapping each other, such that the sum or accumulation of the applied separations 1-*n* forms a complete, e.g. multi-colored, image. In examples, after the heated ITM belt has acquired each of at least partially overlapping separations 1-*n*, the ITM belt is to transfer the resulting completed image in one pass as a molten film to the substrate.

A challenge when conducting LEP printing is to evaporate the carrier fluid from an ITM in a manner that will avoid and/or contain any combustion, and yet be efficient in terms of operating costs and press space. Existing carrier fluid evacuation systems are often designed to maintain a ¼ LEL for carrier fluid concentration during printing and carrier fluid evaporation. Attempts to scale such existing systems to a printer that includes a ITM belt and multiple photoconductive elements, with higher carrier fluid vapor concentrations, can result in a printer footprint and/or operating costs that are undesirable.

To address these issues, various examples described in more detail below provide a system and a method for gas evaporation and flame extinguishment that enable a use of a reduced subject gas evacuation flow, and increased subject gas concentration, relative to current processes. In examples of the disclosure, a gas evaporation and flame extinguishment system includes an evaporation channel for a subject gas, e.g. gas resulting from the evaporation of a carrier fluid utilized in LEP printing. The evaporation channel is defined in part by a first surface, a nozzle of a heated air knife, a mixing zone, and a second surface substantially opposite the first surface. The evaporation channel is to extend from the nozzle of the heated air knife to a cooling channel that intersects with the mixing zone. A negative pressure component is situated within the cooling channel. The subject gas is to be heated and directed through the evaporation channel at a target gas velocity by a positive pressure caused by the heated air knife, and by a negative pressure applied by the negative pressure component. The target gas velocity is above a flame propagation velocity for the subject gas.

In examples, the mixing zone is defined by an intersection of the evaporation channel and the cooling channel. In examples, the mixing zone is to receive, from a first direction along the evaporation channel, the subject gas heated by the heated air knife, and is to receive from a second direction along the first surface cool gas that is at a cooler temperature than the heated subject gas. In examples, air suction provided by the negative pressure component is to create a stagnation area in the mixing zone, the stagnation area for causing the heated subject gas to not proceed along the first surface beyond the mixing zone and for causing a mixture of heated subject gas and cooling gas to proceed through the cooling channel.

The attributes of the gas evacuation and flame extinguishment system, e.g., including evaporation channel geometry and flow rates, described herein are to maintain the subject gas velocity at a safety margin relative to the flame propagation velocity. In examples, the disclosure enables an evaporation channel design that is to keep gas flow velocity markedly higher than flame propagation velocity for the subject gas, while directing the subject gas to a cooling channel. In examples, the target gas velocity for the hydrocarbon solvent subject gas is a safety margin velocity at least 3 times the flame propagation velocity. The velocity profile of the air within the channel is achieved by reducing the evaporation channel gap, while maintaining lower than conventional suction flow by order of magnitude, compared to many existing systems.

The disclosed gas evacuation and flame extinguishment device enables that the subject gas vapor is generated in a specific volume (the evaporation channel), and an accidental flame caused by ignition of combustible gas in the gas evaporation channel is non-sustaining as the flame is to be sucked toward the cooling channel. This is to leave high vapor concentration behind cooling channel without enough energy for continuous flame.

Users and providers of LEP printers, and other devices, will appreciate that the disclosed system and method enable working with high vapor concentration of flammable liquids (increasing the capturing efficiency), while maintaining operator safety and avoiding system damage. The disclosed system and method enable a significantly decreased time of subject gas evaporation and gas flow velocity. The disclosed system has a reduced system footprint, with lower equipment and operational cost relative to current systems. Installations and utilization of printers and other devices that include the disclosed apparatus and methods should thereby be enhanced.

FIGS. 1-4, 5A, 5B, 6, 7, and 8A-8I depict examples of physical and logical components for implementing various examples. In FIGS. 2-4, 5A and 5B a component is described as engine 220. In describing engine 220 focus is on the engine's designated function. However, the term engine, as used herein, refers generally to hardware and/or programming to perform a designated function. As is illustrated later with respect to FIG. 6, the hardware of each engine, for example, may include one or both of a processor and a memory, while the programming may be code stored on that memory and executable by the processor to perform the designated function.

FIG. 1 is a block diagram depicting an example of a gas evaporation and flame extinguishment ("GEFE") system 100. In this example, GEFE system 100 may include an evaporation channel 102 for a subject gas, a first surface 104, a heated air knife 106, a mixing zone 108, a second surface 110 positioned substantially opposite the first surface, a cooling channel 112, and a negative pressure component 114.

In examples, the evaporation channel 102 is defined in part by the first surface 104, a nozzle of the air knife 106, the mixing zone 108, and the second surface 110. In examples, the first surface 104 defines a top boundary of the evaporation channel 102 and the and the second surface 110 defines a bottom boundary of the evaporation channel 102. In examples, the first and second surfaces may be a substantially planar surfaces.

In examples, the first surface 104 may be an ITM for a printer and the second surface may be constructed of, or include, one from the set of a metal, a plastic, a glass, and any other heat-tolerant medium. In examples, the first surface 104 may be an ITM surface constructed from, or that may include, rubber and/or a silicon-based coating material. In certain examples the ITM may be attached to a rotatable drum, with the first surface 104 being heatable and positioned for selective engagement with a photoconductive element (e.g. a photoconductive element attached to a drum). In other examples, the ITM may be an endless ITM belt situated upon a set of rollers, with the first surface 104 being heatable and positioned for selective engagement with a photoconductor element or a set of photoconductor elements.

Continuing at FIG. 1, in examples, the heated air knife 106 defines a starting point, and the mixing zone 108 defines an ending point, for the evaporation channel 102 in relation to direction of flow of the subject gas. As used herein "air knife" refers generally to an electromechanical device for providing a heated airflow. In examples, the heated air knife may include one or more nozzles and may be capable of providing a heated air flow between 60 m/s and 400 m/s, at temperatures between 110 C and 220 C.

The mixing zone 108 is an area that has the first surface 104 as a top boundary, and that is fluidly connected to, and downstream of, the evaporation channel 102. The mixing zone 108 is so named as it is an area for mixing of heated subject gas and a cooler gas. As used herein a first component being in "fluid connection with" or "fluidly connected to" a second component refers generally to the first and second components being connected in a manner that a fluid is enabled to flow from the first to the second component, or the reverse. In an example, the heated subject gas is to be received into the mixing zone 108 from the evaporation channel 102, and a cooler gas (e.g. air, or subject gas mixed with air) is to enter the mixing zone 108 from a source other than the evaporation channel 102. In an example, the cooler gas may enter the mixing zone 108 from a direction substantially opposite a direction that the heated subject gas is moving as a result of a nozzle of the heated air knife 106 directing the subject gas to the mixing zone 108. In examples, the GEFE system 100 is open to atmospheric pressure both upstream and downstream of the evaporation channel 102, such that the air knife 106 and the mixing zone 108 may take advantage of ambient air in performing their respective heating and mixing functions.

The negative pressure component 114 is an electromechanical devices situated in, or adjacent to, the cooling channel 112. In examples, the negative pressure component 114 may be or include a vacuum, a pump, or fan. The negative pressure component 114 is to provide a negative pressure to the cooling channel 112, thereby assisting the heated air knife 106 (the heated air knife applies a positive pressure in the evaporation channel) in directing the subject gas at a target gas velocity through the evaporation channel 102. In examples, the negative pressure component 114 causes the subject gas to travel from the evacuation channel 102 into the mixing zone 108, and in turn from the mixing zone into the cooling channel 112.

Continuing at FIG. 1, the target velocity at which the subject gas is directed through the evaporation channel is a velocity that is above a flame propagation velocity for the subject gas. As used herein, "flame propagation velocity" is used synonymously with "flame speed" and refers generally to a rate of expansion of a flame front in a combustion reaction. In this manner, a self-sustained fire or flame in the evaporation channel is avoided. The evaporation channel 102 geometry and flow rates described herein are to maintain the subject gas velocity at a safety margin relative to the flame propagation velocity. In examples, the target gas velocity for the subject gas is a safety margin velocity at least 3 times the flame propagation velocity for the subject gas. In a particular example, the safety margin velocity is approximately 10 times the flame propagation velocity for the subject gas.

In a particular example the subject gas may be a vaporized carrier fluid for a printing press. In examples, the carrier fluid vapor may be, or may include, an isoparaffinic hydrocarbon solvent and the flame propagation velocity may be 0.5-1.5 m/s for the gas pressure up to 17 bar. In examples, by directing the carrier fluid vapor at a safety margin velocity at least 3 times the flame propagation velocity, the pressure within the evaporation channel be can be established at 14 bar or less. This affords a desirable margin from bar pressures that in some circumstances may be associated with an ignition or explosion of an isoparaffinic hydrocarbon solvent subject gas.

The cooling channel 112 is fluidly connected to the mixing zone 108. In examples, the cooling channel 112 may be defined by a conduit or tubing that connects the mixing zone 108 to a condensation collection container. In examples, the cooling channel 112 is for lowering temperature of the subject gas below an autoignition temperature as the subject gas is directed through the cooling channel.

Figure 2:
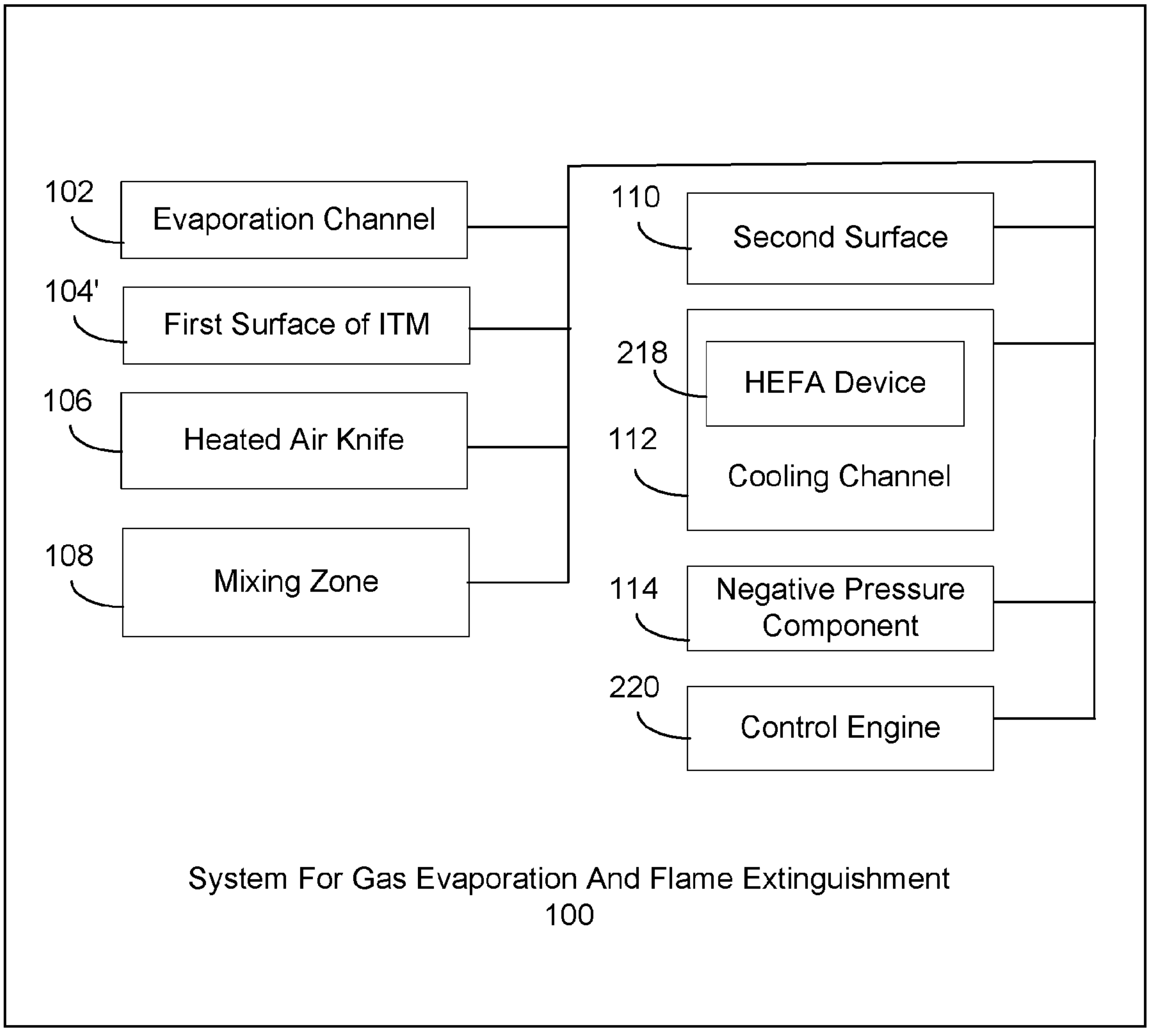
FIG. 2 is block diagram depicting another example of a gas evaporation and flame extinguishment system.

FIG. 2 is block diagram depicting another example of a gas evaporation and flame extinguishment system that is substantially similar to the GEFE system of FIG. 1. In this example, the first surface 104' is a surface of an ITM. The second surface 110 is situated substantially opposite the ITM's first surface 104'. The second surface 110 may be a substantially planar surface 110 of an element of a printer. In examples the second surface may be constructed from, or include, a metal, a plastic, a glass, or any other heat-tolerant medium.

Continuing with the example of FIG. 2, the subject gas may be or include an evaporated carrier fluid vapor. The subject gas is the result of evaporation of liquid carrier fluid in the evaporation channel 102. In examples, the carrier fluid vapor is at an entry state temperature between 110 C and 220 C as the carrier fluid vapor enters the evaporation channel 102. In examples, a nozzle of the air knife 108 is to provide a heated gas stream of between 110 C and 220 C into the evaporation channel 102. In examples, the carrier fluid vapor is heated to attain a hot state in the evaporation channel 102 wherein the temperature rises to between 130 C and 230 C with a target velocity of greater than 3 m/s and a pressure of 14 bar or less.

In examples, the hot state temperature, which is conducive for rapid evaporation of the subject gas, is maintained as the subject gas moves through the evaporation channel 102 and into the mixing zone 108. The subject gas is raised to its highest temperature, a temperature above flash point yet below autoignition temperature, at the point of the air nozzle at the beginning of the evaporation channel 102.

In the example of FIG. 2, the cooling channel 112 is, or includes, a heat exchange and flame arrest ("HEFA") device 218. In examples, the HEFA device has a set of fins and a HEFA device cooling fluid pathway. The combination of the gap between each fin of the set and the cooling capacity of a cooling fluid pathway of the HEFA device is sufficient to, if the subject gas, e.g., carrier fluid vapor, has ignited, lower temperature of the subject gas below an autoignition temperature and to at least partially condense the subject gas. As used herein, "autoignition temperature" refers generally to a temperature at which a vapor of a flammable material can spontaneously ignite when mixed with air without a power source (also known as an ignition source). Autoignition temperature is sometimes referred to as a "kindling point." If a subject gas does ignite, the flame can be suppressed by reducing the temperature of the subject gas to below the autoignition temperature. Autoignition is to be distinguished from flash point. As used herein, "flash point" refers generally to a lowest temperature at which a material or vapor (e.g., a subject gas) is flammable when mixed with air and a power source.

The control engine 220 represents generally a combination of hardware and programming to control the heated air knife 106 and the negative pressure component 220 to regulate the heating (regulating temperature as influenced by the heated air knife 106) and direction (regulating velocity as influenced by the heated air knife 106 and the negative pressure component 114) of the subject gas at the target gas velocity through the evaporation channel 102. In examples, the control engine 220 may include, or control, a flow switch for the air knife 106 and a flow switch for the negative pressure component 114, so to regulate movement of the subject gas through the evaporation channel 102 to achieve the target velocity.

Figure 3:
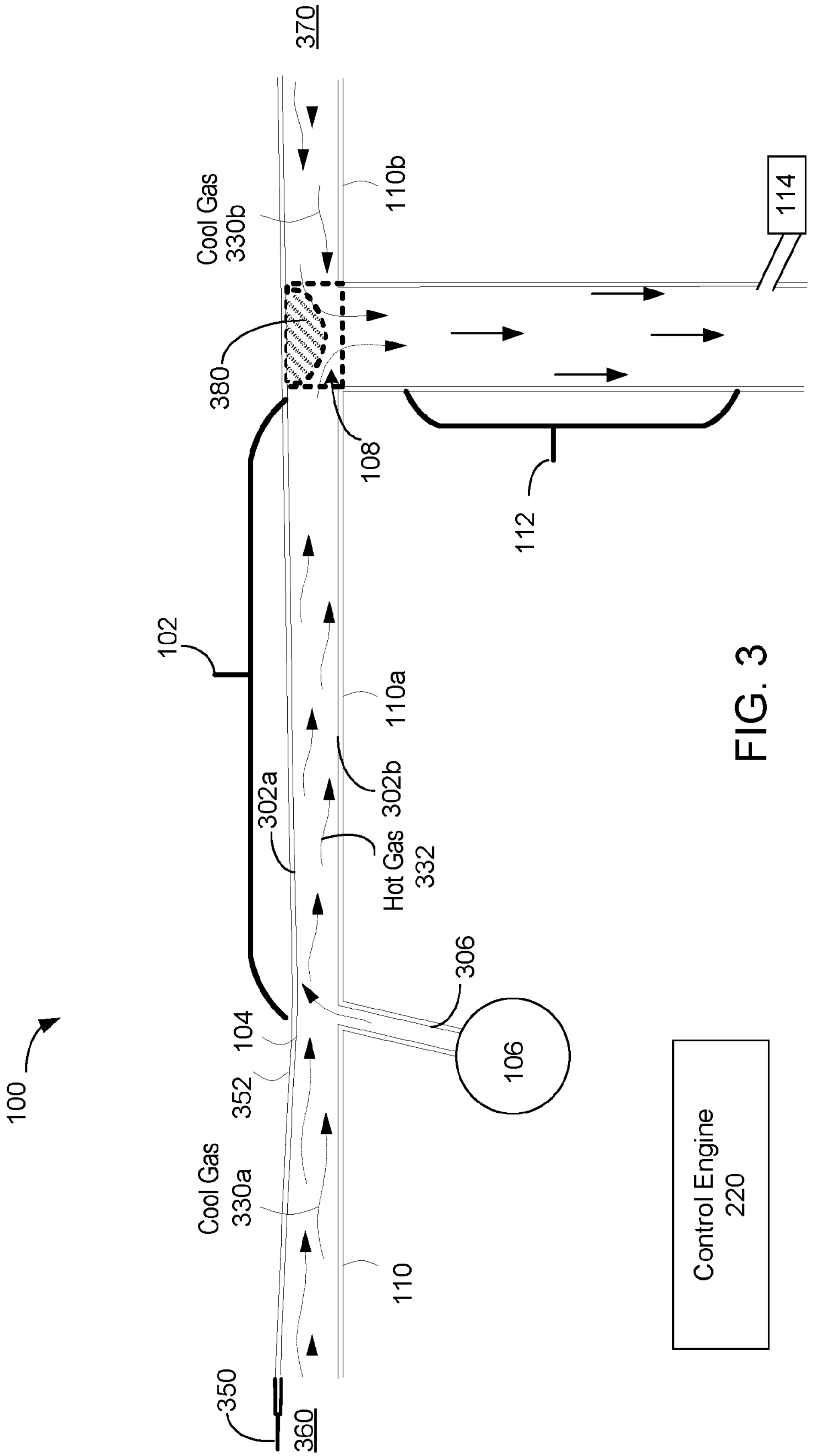
FIG. 3 is a simple schematic diagram that illustrates an example of a gas evaporation and flame extinguishment system.

FIG. 3 is a simple schematic diagram that illustrates an example of a gas evaporation and flame extinguishment system. The GEFE system 100 includes a belt 350 with a first surface 104 and with a second surface 352 opposite the first surface 104. A heated air knife 106 with a nozzle 306 pointed towards the belt first surface 104. A first element with a substantially planar second surface 110_a_ is positioned substantially opposite the first surface 104 of the belt 350. A second element with a substantially planar third surface 110_b_ is positioned substantially opposite the first surface 104 of the belt 350, wherein the first and second elements are separated by a mixing zone 108. The mixing zone is fluidly connected to a cooling channel 112 that is extended away from the first surface 104 of the belt 350.

The GEFE system 100 includes an evaporation channel 102 for a subject gas, the evaporation channel having a first side 302_a_ that is defined by a portion of the first surface 104 of the belt 350, and having a second side 302_b_ opposite the first side 302_a_, the second side beginning at the air knife nozzle 306 and extending along the substantially planar second surface 110_a_ of the first element to end at the mixing zone 108.

Continuing at FIG. 3, the GEFE system 100 includes a negative pressure component 114 that is in fluid connection with the cooling channel 112. The subject gas, initially at a cool state 330*a*, is to be heated and directed through the evaporation channel 102 at a target gas velocity by a positive pressure caused by the heated air knife 106 and a negative pressure applied by the negative pressure component 114. The target velocity is above a flame propagation velocity for the subject gas.

In examples, the GEFE system 100 is open to atmospheric pressure both upstream 360 and downstream 370 of the evaporation channel 102, such that the air knife 106 and the mixing zone may take advantage of ambient air in performing their respective heating and mixing functions.

In examples, the heating and directing of the subject gas through the evaporation channel 102 with a positive pressure provided by the heated air knife 106 and a negative pressure applied by the negative pressure component 114 creates a stagnation area 380 within the mixing zone 108. In examples the stagnation area 380 is to cause the heated subject gas 332 to not proceed along the first side 104 of the belt 350 beyond the mixing zone 108, and is to cause a mixture of the heated subject gas 332 and the cool gas 330*b* to proceed through the cooling channel 112.

In examples, the first surface 104 of the belt 350 may be structured with sufficient flexibility and positioned so as to serve as a pressure relief element for the evaporation channel 102. In this manner, if there is a shock ignition or combustion of a subject gas in the evaporation channel 102, the first surface 104 of the belt 350 can move away from the evaporation channel absorbing some or all of any shock wave that results from such ignition or combustion. In examples, the movement of the first surface 104 is to reduce the gas pressure that might otherwise build in the evaporation channel 102, and thereby remove a condition for a blast or other uncontrolled combustion of the subject gas.

The GEFE system 100 includes a control engine 220 to control the heated air knife 106 and its nozzle 306, and to control the negative pressure component 114 to control heating and direction of the subject gas through the evaporation channel 102 at the target gas velocity.

Figure 4:
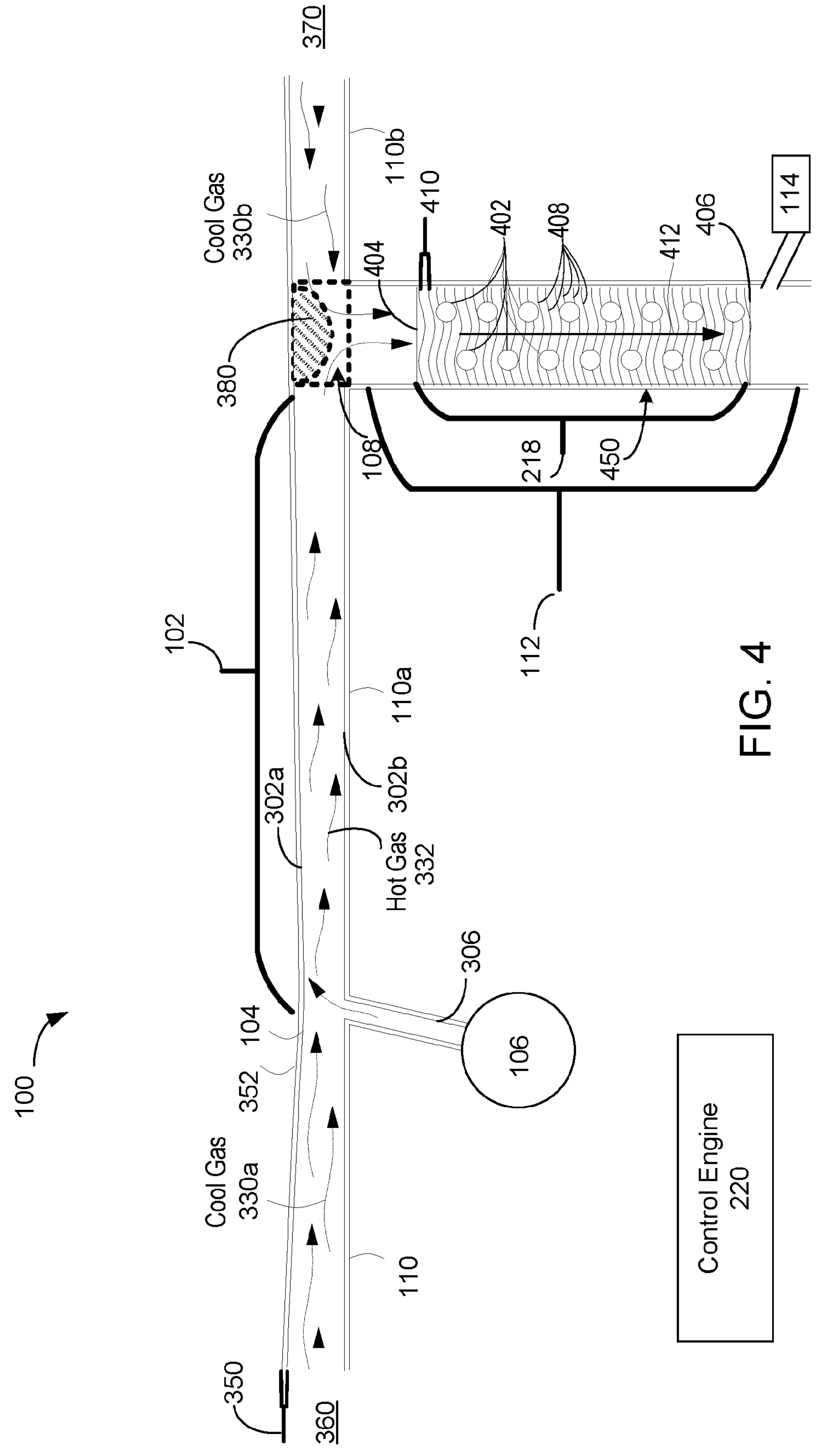
FIG. 4 is a simple schematic diagram that illustrates another example of a gas evaporation and flame extinguishment system.

FIG. 4 is a simple schematic diagram that illustrates another example of a gas evaporation and flame extinguishment system. In this example, the GEFE system 100 is substantially similar to the GEFE system of FIG. 3 and includes a HEFA device 218 situated within the cooling channel 112.

In this example the HEFA device 218 includes a core 450 and tubing 402 arranged to traverse the core. The core includes a gas flow inlet 404, a set of cooling fins 408, and a gas flow outlet 406. The gas flow inlet 404, the set of fins 408, and the gas flow outlet 406 collectively form a gas flow pathway 412 for a subject gas.

Each fin of the set of fins is positioned to form a gap 410 between that fin and an adjacent fin. In certain examples, the fins are arranged longitudinally relative to the gas flow pathway 412. In certain examples, the gap between each cooling fin of the set 408 is to be greater than quenching diameter for the subject gas.

Continuing at FIG. 4, in examples, the subject gas is to enter the HEFA device's 218 gas flow inlet 404 from the mixing zone 108. The combination of the gap 410 between each fin of the set 408 and the cooling capacity of a cooling fluid pathway (e.g., through tubing 402) is sufficient to, if the subject gas has ignited, lower temperature of the subject gas below an autoignition temperature and to at least partially condense the subject gas.

In examples, the cooling capacity of a particular HEFA device's 218 cooling pathway may be function of geometric and cooling attributes of the tubing 402 (e.g., length, diameter, composition) and the set of fins 408 (e.g., gap 410 between fins, fin composition). In a particular example, the HEFA device 100 cooling pathway may have a geometry that includes a multi-pass parallel-and-counter cooling fluid cross flow relative to the HEFA device gas flow pathway 412.

Figure 5A:
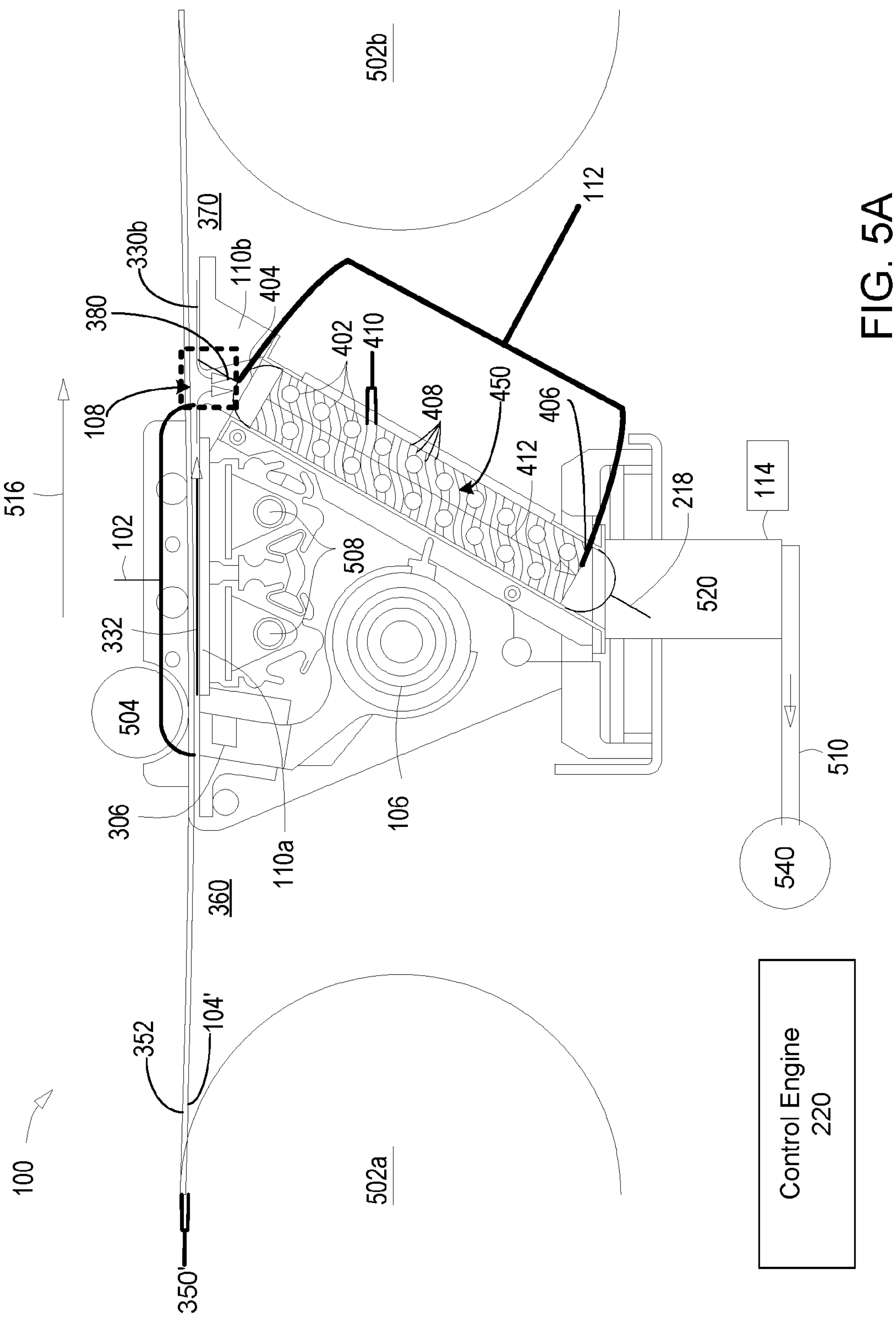
FIGS. 5A and 5B are simple schematic diagrams that illustrate examples of a gas evaporation and flame extinguishment system for a printer.

FIG. 5A is a simple schematic diagram that illustrates another example of a gas evaporation and flame extinguishment system for a printer. In this example, the GEFE system 100 includes an intermediate transfer member ITM belt 350' with a first surface 104' and with a second surface 352 opposite the first surface. A heated air knife 106 with a nozzle 306 pointed towards the ITM belt first surface 104' is a first heat source. A first element with a substantially planar second surface 110*a* that is a transparent or substantially transparent cover for a second heat source 508 that is positioned substantially opposite the first surface 104' of the ITM belt 350'. In examples, the second heat source 508 may include one or more elements from the set of an infrared heat lamp, a heat laser, and a LED. The second heat source 508 is for heating the subject gas as the subject gas is moved by the heated air knife 106 through the evaporation channel 102 and towards the mixing zone 108.

A second element with a substantially planar third surface 110*b* is positioned substantially opposite the first surface 104' of the ITM belt 350', wherein the first and second elements are separated by a mixing zone 108. The mixing zone is fluidly connected to a cooling channel 112 that is extended away from the first surface 104' of the ITM belt 350'.

The GEFE system 100 includes an evaporation channel 102 for a subject gas. The evaporation channel 102 has a first side that is defined by a portion of the first surface 104' of the ITM belt 350'. The evaporation channel has a second side, substantially opposite the first side, that begins at the air knife nozzle 306 and is extended along the substantially planar surface 110*a*, that is a cover for the set of heat sources 508, to end at the mixing zone 108.

The GEFE system 100 includes a negative pressure component 114 that is in fluid connection with the cooling channel 112. The subject gas is to be heated and directed through the evaporation channel 102 at a target gas velocity by a positive pressure caused by the heated air knife 106 and a negative pressure applied by the negative pressure component 114. The target velocity is above a flame propagation velocity for the subject gas.

Continuing at FIG. 5A, in this example, the GEFE system 100 is open to atmospheric pressure both upstream 360 and downstream 370 of the evaporation channel 102. The air knife 106 receive ambient air 360 to perform its heating and gas directing functions. The mixing zone is to receive cool state ambient air 370 to enable the mixing of the heated or hot state gas 332 and the cool state gas 330*b* to perform its mixing function.

In examples, the heating and directing of the subject gas through the evaporation channel 102 with a positive pressure provided by the heated air knife 106 and a negative pressure applied by the negative pressure component 114 creates a stagnation area 380 within the mixing zone 108. In examples the stagnation area 380 is to cause the heated subject gas 332 to not proceed along the first surface 104' of the ITM belt 350' beyond the mixing zone 108, and is to cause a mixture of the heated subject gas 332 and the cool gas 330*b* to proceed through the cooling channel 112.

Continuing at FIG. 5A, in examples the subject gas may be or include an isoparaffinic hydrocarbon solvent vapor, and such subject gas is to be heated to a hot state temperature between 130 C and 230 C within the evaporation channel. In this example, the target gas velocity is greater than 3 m/s at a pressure 14 bar or less.

The GEFE system 100 includes a HEFA device 218 with a core and tubing 402 arranged to traverse the core. The core includes a gas flow inlet 404, a set of cooling fins 408, and a gas flow outlet 406. The gas flow inlet, the set of fins, and the gas flow outlet collectively form a gas flow pathway 412 for a subject gas. Each fin of the set of fins is positioned to form a gap 410 between that fin and an adjacent fin. In certain examples, the fins are arranged longitudinally relative to the gas flow pathway 412. The subject gas is to enter the gas flow inlet 404. The combination of the gap 410 between each fin of the set 408 and the cooling capacity of a cooling fluid pathway (e.g., through tubing 402) is sufficient to, if the subject gas has ignited, lower temperature of the subject gas below an autoignition temperature and to at least partially condense the subject gas.

Continuing at FIG. 5A, in examples the first surface 104' of the ITM belt 350' is in functional contact with a first photoconductor 502*a* that is upstream of the evaporation channel 102, and a second photoconductor 502*b* that is downstream of the evaporation channel 102, relative to the direction 516 of the gas flow in the evaporation channel 102. In examples the direction of gas flow 516 in the evaporation channel is a same direction as a direction that the ITM belt 350' is to travel. The first 502*a* and second 502*b* photoconductors are for applying layers of LEP printing fluid to the ITM belt 350' according to a predetermined pattern, forming an inked image to be subsequently transferred from the ITM belt 350' to a substrate.

In this example, the GEFE system 100 includes an idler roller 504 that applies a pressure to the ITM belt 350' such that the evaporation channel 102 is maintained at a constant width, or a width of an accepted range. In other examples, the GEFE system 100 may include other rollers positioned adjacent to the second side 352 of the ITM belt 350'.

In this example, the GEFE system 100 includes a carrier fluid return 510 that is or includes piping or conduit for transfer of condensed carrier fluid from a condensation collection container 520 to a mixing chamber 540. In this manner the condensed carrier fluid may be combined with colorant particles to form an LEP printing fluid and thus reused in printing operations at a printing press.

In the example of FIG. 5A, the first surface 104' of the ITM belt 350' is structured and positioned so as to serve as a pressure relief element for the evaporation channel 102. If there is a shock ignition or combustion of a subject gas in the evaporation channel 102, the first surface 104' is to move away from the evaporation channel, and thereby absorb some or all of any shock wave that results from such ignition or combustion.

Continuing with the example of FIG. 5A, the GEFE system 100 includes a control engine 220 to control the heated air knife 106 and its nozzle 306, and to control the negative pressure component 114 to control heating and direction of the subject gas through the evaporation channel 102 at the target gas velocity. In examples, the control engine 220 may control the negative pressure component regulate the negative pressure applied to the cooling channel 112. In examples, the control engine 220 may control another negative or positive pressure component to direct the condensed carrier fluid from the condensation collection container 520, along the carrier fluid return 510, and into the mixing chamber 540.

Figure 5B:
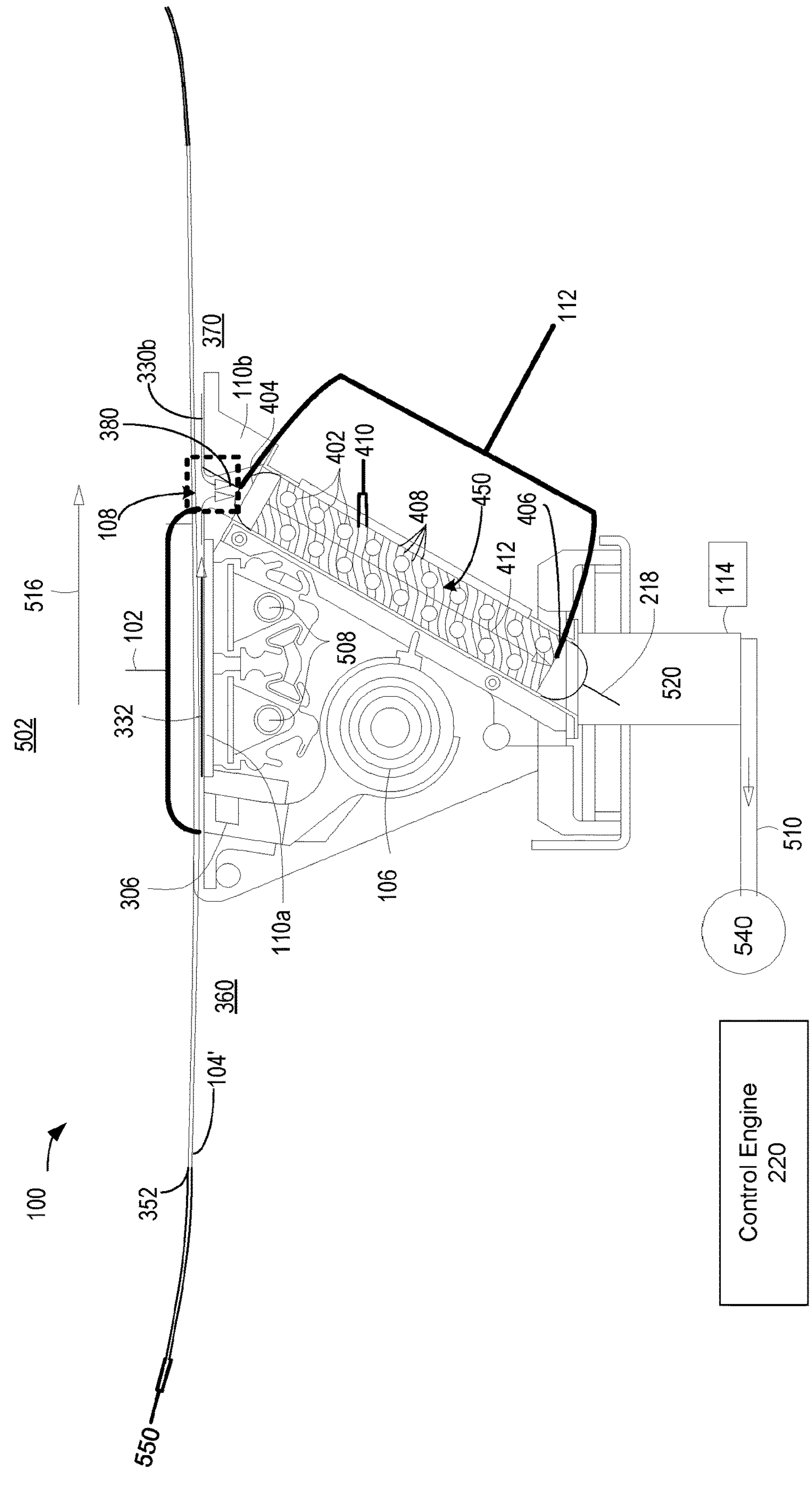

FIG. 5B is a simple schematic diagram that illustrates another example of a gas evaporation and flame extinguishment system for a printer. The example GEFE system 100 of FIG. 5B is substantially similar to that of FIG. 5A, with a difference that in the system of FIG. 5B the first surface 104' is a surface of an ITM 550 that is mounted to a rotatable drum 552 (the entirety of the drum is not visible in FIG. 5B), rather than a surface of an ITM belt 350' as in FIG. 5A. In the example of FIG. 5B, the first surface 104' of the ITM 550 may be in functional conduct with a photoconductive element (e.g. a photoconductor mounted on a rotatable drum). The photoconductive element is for applying a layer or layers of LEP printing fluid to first surface 104' of the ITM 550 according to a predetermined pattern, forming an inked image to be subsequently transferred by the first surface 104' to a media. In examples the direction of gas flow 516 in the evaporation channel 102 is a same direction as a direction 516 that the ITM 550 is to travel as a result of rotation of the drum 502.

In the foregoing discussion of FIGS. 2-4, 5A and 58, control engine 220 was described as a combination of hardware and programming. Engine 220 may be implemented in a number of fashions. Looking at FIG. 6 the programming may be processor executable instructions stored on a tangible memory resource 680 and the hardware may include a processing resource 690 for executing those instructions. Thus, memory resource 680 can be said to store program instructions that when executed by processing resource 690 implement the GEFE device 100 of FIGS. 2-4, 5A and 5B.

Memory resource 680 represents generally any number of memory components capable of storing instructions that can be executed by processing resource 690. Memory resource 680 is non-transitory in the sense that it does not encompass a transitory signal but instead is made up of a memory component or memory components to store the relevant instructions. Memory resource 680 may be implemented in a single device or distributed across devices. Likewise, processing resource 690 represents any number of processors capable of executing instructions stored by memory resource 680. Processing resource 690 may be integrated in a single device or distributed across devices. Further, memory resource 680 may be fully or partially integrated in the same device as processing resource 690, or it may be separate but accessible to that device and processing resource 690.

In one example, the program instructions can be part of an installation package that when installed can be executed by processing resource 690 to implement device 100. In this case, memory resource 680 may be a portable medium such as a CD, DVD, or flash drive or a memory maintained by a server from which the installation package can be downloaded and installed. In another example, the program instructions may be part of an application or applications already installed. Here, memory resource 680 can include integrated memory such as a hard drive, solid state drive, or the like.

Figure 6:
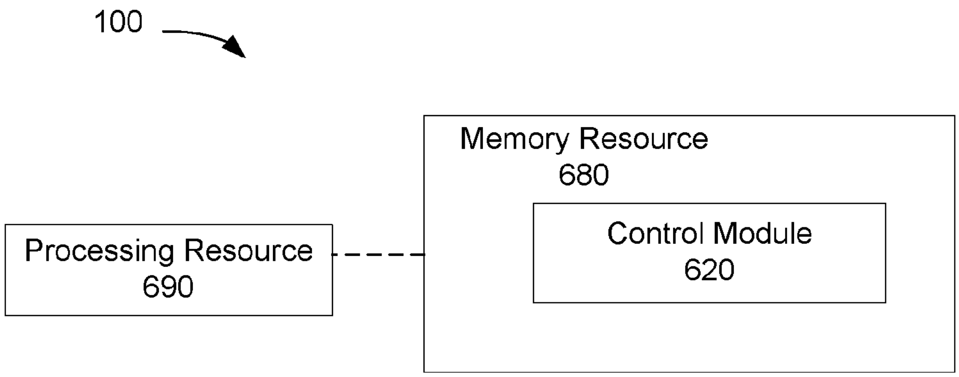
FIG. 6 is a block diagram depicting a memory resource and a processing resource to implement an example of a method for providing evaporation and flame extinguishment for a subject gas.

In FIG. 6, the executable program instructions stored in memory resource 680 are depicted as a control module 620. Control module 620 represents program instructions that when executed by processing resource 690 may perform any of the functionalities described above in relation to control engine 220 of FIGS. 2-4, 5A and 5B.

Figure 7:
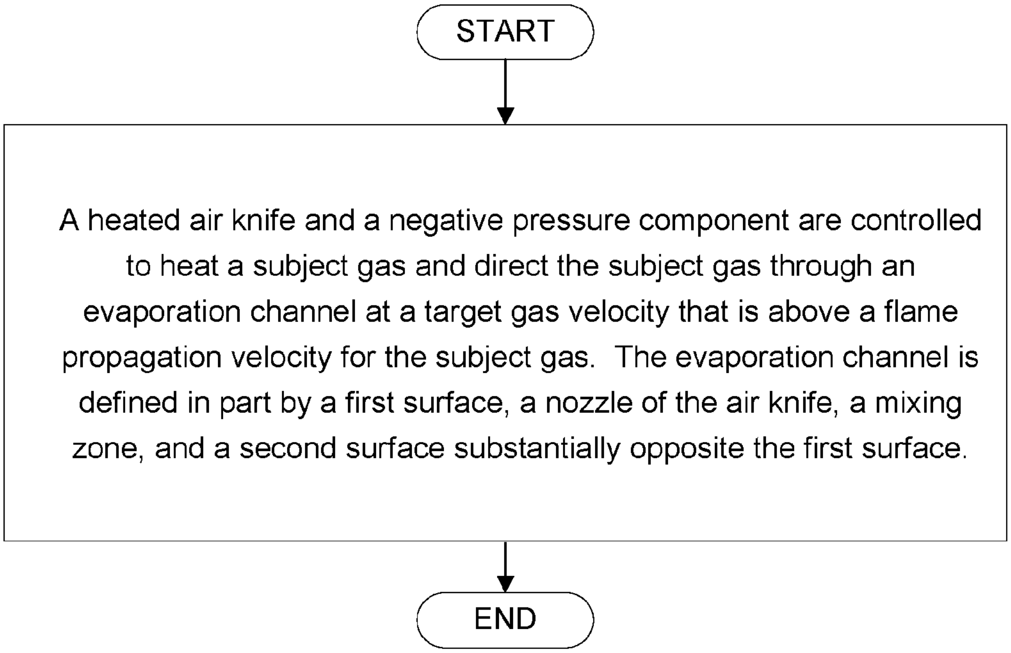
FIG. 7 is a flow diagram depicting an example implementation of a method for providing evaporation and flame extinguishment for a subject gas.

FIG. 7 is a flow diagram of implementation of a method for providing heat exchange and flame extinguishment for a subject gas. In discussing FIG. 7, reference may be made to the components depicted in FIGS. 2-4, 5A and 5B. Such reference is made to provide contextual examples and not to limit the way the method depicted by FIG. 7 may be implemented.

A heated air knife and a negative pressure component are controlled to heat a subject gas and direct the subject gas through an evaporation channel at a target gas velocity that is above a flame propagation velocity for the subject gas. The evaporation channel is defined in part by a first surface, a nozzle of the air knife, a mixing zone, and a second surface substantially opposite the first surface (block 702). Referring back to FIGS. 2-4. 5A. 5B. and 6, control engine 220 (FIGS. 2-4, 5A and 5B) or control module 620 (FIG. 6), when executed by processing resource 690, may be responsible for implementing block 702.

In a certain example of the method of block 702, the target gas velocity is a safety margin velocity at least 3 times the flame propagation velocity. The controlling is to cause the subject gas to move sequentially from the evaporation channel through the mixing zone, and into a cooling channel fluidly connected to the mixing zone. The cooling channel is for lowering temperature of the subject gas below an autoignition temperature.

FIGS. 8A-8I are simple schematic diagrams that illustrates flame extinguishment within an evaporation channel of an example gas evaporation and flame extinguishment system. Beginning at FIG. 8A, a heated subject gas 332 is directed along an evaporation channel 102. The evaporation channel is defined in part by a first surface 104 and a second surface 110. The evaporation channel 102 extends from a nozzle 306 of a heated air knife to a cooling channel 112 that intersects with the evaporation channel 102. The subject gas is heated and directed through the evaporation channel at a target gas velocity utilizing positive pressure provided by the heated air knife and a negative pressure provided by a negative pressure component (e.g. 114 FIGS. 1-4, 5A and 5B) situated within the cooling channel 112. The target velocity is above a flame propagation velocity for the subject gas. The mixing zone 108 is to receive, from a first direction 804 along the evaporation channel 102, the subject gas heated by the heated air knife (see 106 FIGS. 1-4, 5A and 5B), and is to receive from a second direction 806 cooling gas that is at a cooler temperature than the heated subject gas.

Figures 8A, 8B, 8C, 8D, 8E, 8F, 8G, 8H, 8I:
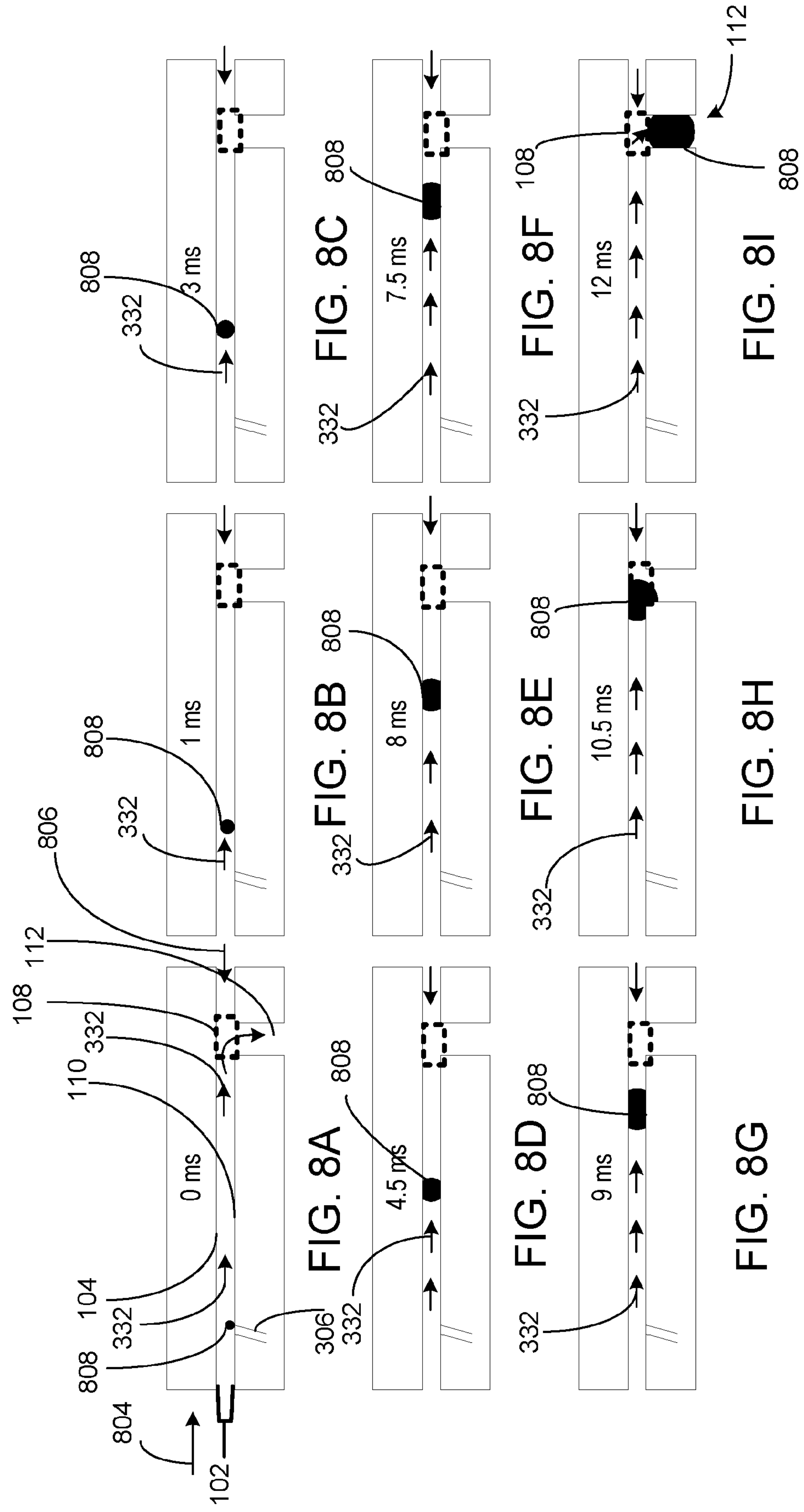
FIGS. 8A-8I are simple schematic diagrams that illustrates flame extinguishment within an evaporation channel of an example gas evaporation and flame extinguishment system.

At FIG. 8A a flame 808 that has been unintentionally created as the result of an ignition or combustion of a flammable gas (e.g., a carrier fluid) within the evaporation channel 102.

Moving to FIGS. 8B-8H, in this example the flame 808 continues to grow, but is pushed through the evaporation channel 102 by the hot state gas that is directed by the hot air knife nozzle 306 and the negative pressure component.

Moving to FIG. 8I, in this example the subject gas is directed to move sequentially from the evaporation channel 102, through the mixing zone 108, and into the cooling channel 112 that is fluidly connected to the mixing zone. The mixing zone 108 and the cooling channel 112 are for lowering temperature of the subject gas below an autoignition temperature. As a result, there are no conditions for self-sustaining fire in the evaporation channel 102, the mixing zone 108, or the cooling channel 112.

FIGS. 1-4, 5A, 5B, 6-7, and 8A-8I aid in depicting the architecture, functionality, and operation of various examples. In particular, FIGS. 1-4, 5A, 5B, 6, and 8A-8I depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor-based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A gas evaporation and flame extinguishment ("GEFE") system in a printing device, comprising:
- a first surface;
- a second surface situated substantially opposite the first surface;
- a heated air knife;
- a mixing zone;
- a cooling channel fluidly connected to the mixing zone;
- an evaporation channel for a subject gas,
- wherein the evaporation channel is defined in part by the first surface, a nozzle of the air knife, the mixing zone, and the second surface;
- wherein the evaporation channel extends from the nozzle to the mixing zone;
- a negative pressure component,
- wherein the subject gas is to be heated and directed through the evaporation channel at a target gas velocity by a positive pressure caused by the heated air knife and a negative pressure applied by the negative pressure component; and wherein the target gas velocity is above a flame propagation velocity for the subject gas.

2. The GEFE system of claim 1, wherein the target gas velocity for the subject gas is a safety margin velocity at least 3 times the flame propagation velocity for the subject gas.

3. The GEFE system of claim 1, wherein the mixing zone is to receive, from a first direction along the evaporation channel, the subject gas heated by the heated air knife, and is to receive from a second direction cooling gas that is at a cooler temperature than the heated subject gas.

4. The GEFE system of claim 1, wherein the heating and directing of the subject gas creates a stagnation area in the mixing zone; and wherein the stagnation area is to cause the heated subject gas to not proceed along the first surface beyond the mixing zone and is to cause a mixture of heated subject gas and cooling gas to proceed through the cooling channel.

5. The GEFE system of claim 1, wherein the heated air knife is a first heat source, and;

wherein the second surface is or includes a cover for a second heat source.

6. The GEFE system of claim 1, wherein the first surface is a surface of an intermediate transfer member ("ITM") of a printer.

7. The GEFE system of claim 6, wherein the subject gas is or includes an isoparaffinic hydrocarbon solvent carrier fluid; and wherein the target velocity is greater than 3 m/s with a pressure of 14 bar or less.

8. The GEFE system of claim 6, wherein the ITM is an ITM belt, and wherein the ITM belt is positioned to serve as a pressure relief element for the evaporation channel to control pressure and combustion within the evaporation channel.

9. The GEFE system of claim 1, wherein the cooling channel includes a heat exchange and flame arrest ("HEFA") device with a set of fins and a cooling fluid pathway; and wherein combination of a gap between each fin of the set, and a cooling capacity of the cooling fluid pathway, is sufficient to, if the subject gas has ignited, lower temperature of the subject gas below an autoignition temperature and to at least partially condense the subject gas.

10. A method for providing heat exchange and flame extinguishment for a subject gas in a printing device, comprising:

controlling a heated air knife and a negative pressure component to heat a subject gas and direct the subject gas through an evaporation channel at a target gas velocity that is above a flame propagation velocity for the subject gas;

wherein the evaporation channel is defined in part by a first surface, a nozzle of the air knife, a mixing zone, and a second surface substantially opposite the first surface.

11. The method of claim 10, wherein the target gas velocity is a safety margin velocity at least 3 times the flame propagation velocity;

wherein the controlling causes the subject gas to move sequentially from the evaporation channel through the mixing zone, and into a cooling channel fluidly connected to the mixing zone; and wherein the cooling channel is for lowering temperature of the subject gas below an autoignition temperature.

12. A system for gas evaporation and flame extinguishment at a printer, comprising:

an intermediate transfer member ("ITM") with a first surface;

a heated air knife with a nozzle pointed towards the first surface;

a first element with a second surface positioned substantially opposite the first surface;

a second element with a third surface positioned substantially opposite the first surface;

a mixing zone that separates the second surface from the third surface;

a cooling channel that is fluidly connected to the mixing zone, and that is extended away from the surface of the ITM;

an evaporation channel for a subject gas, the evaporation channel having a first side that is defined by a portion of the first surface, and having a second side beginning at the air knife nozzle and extending along the second surface to end at the mixing zone;

a negative pressure component in fluid connection with the cooling channel;

wherein the subject gas is to be heated and directed through the evaporation channel at a target gas velocity by a positive pressure caused by the heated air knife and a negative pressure applied by the negative pressure component;

wherein the target velocity is a safety margin velocity at least 3 times above a flame propagation velocity for the subject gas; and a control engine to control the heated air knife and the negative pressure component to control heating and direction of the subject gas through the evaporation channel at the target gas velocity.

13. The system of claim 12, wherein the subject gas is or includes an isoparaffinic hydrocarbon solvent vapor;

wherein the subject gas is heated to a temperature between 130 C and 230 C within the evaporation channel; and wherein the target gas velocity is greater than 3 m/s at a pressure 14 bar or less.

14. The system of claim 12, wherein the heated air knife is a first heat source, and wherein the second surface is or includes a cover for a second heat source; and wherein the belt is positioned to serve as a pressure relief element for the evaporation channel in the event of an ignition of the subject gas.

15. The system of claim 12, wherein the ITM is an ITM belt.

* * * * *